US006735068B1

(12) United States Patent
Hartman et al.

(10) Patent No.: US 6,735,068 B1
(45) Date of Patent: May 11, 2004

(54) ELECTRICAL APPARATUS EMPLOYING ONE OR MORE HOUSING SEGMENTS

(75) Inventors: Thomas C. Hartman, Allegany, NY (US); Michael M. Ramarge, Olean, NY (US)

(73) Assignee: McGraw-Edison Company, Houston, TX (US)

( * ) Notice: Subject to any disclaimer, the term of this patent is extended or adjusted under 35 U.S.C. 154(b) by 132 days.

(21) Appl. No.: 09/819,900

(22) Filed: Mar. 29, 2001

(51) Int. Cl.⁷ .................................................. H02H 1/00
(52) U.S. Cl. ........................................ 361/127; 361/117
(58) Field of Search ............................ 361/127, 56, 58, 361/117, 118, 131, 120, 126, 125, 128

(56) References Cited

U.S. PATENT DOCUMENTS

| | | | | |
|---|---|---|---|---|
| 3,903,494 A | | 9/1975 | May | |
| 4,352,140 A | | 9/1982 | Axelsson et al. | |
| 4,427,843 A | | 1/1984 | Ishihara et al. | |
| 4,851,955 A | | 7/1989 | Doone et al. | |
| 4,992,906 A | | 2/1991 | Doone et al. | |
| 5,003,689 A | | 4/1991 | Doone et al. | |
| 5,159,158 A | | 10/1992 | Sakich et al. | |
| 5,159,748 A | | 11/1992 | Doone et al. | |
| 5,214,249 A | | 5/1993 | Goch et al. | |
| 5,218,508 A | | 6/1993 | Doone | |
| 5,336,852 A | | 8/1994 | Goch et al. | |
| 5,374,789 A | | 12/1994 | Bernstorf | |
| 5,680,289 A | | 10/1997 | Robinson et al. | |
| 5,695,841 A | | 12/1997 | Mazeika et al. | |
| 5,923,518 A | * | 7/1999 | Hensley | 361/117 |
| 6,008,975 A | * | 12/1999 | Kester et al. | 361/117 |
| 6,008,977 A | | 12/1999 | Thatcher | |
| 6,396,676 B1 | | 5/2002 | Doone et al. | |

* cited by examiner

*Primary Examiner*—Rajnikant B. Patel
(74) *Attorney, Agent, or Firm*—Fish & Richardson P.C.

(57) ABSTRACT

An electrical apparatus includes at least one housing segment and at least one MOV disk. The housing segment includes a sheath and defines a bore having a first opening at one end of the housing segment and a second opening at the opposite end of the housing segment. The MOV disk is positioned within the bore. An adhesive is positioned in the bore between the MOV disk and the housing segment and is configured to circumferentially bond the MOV disk to the housing segment.

28 Claims, 10 Drawing Sheets

ELECTRICAL APPARATUS EMPLOYING ONE OR MORE HOUSING SEGMENTS

TECHNICAL FIELD

The technical field relates to an electrical apparatus, and more particularly to an electrical apparatus, such as a surge arrester, that employs one or more housing segments.

BACKGROUND

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment under normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment so as to shunt or divert over-voltage-induced current surges safely around the equipment, and to thereby protect the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

When the over-voltage condition has passed, the surge arrester returns to operation in the high impedance mode. This high impedance mode prevents normal current at the system frequency from flowing through the surge arrester to ground.

Conventional surge arresters typically include an elongated outer enclosure or sheath made of an electrically insulating material, such as porcelain, a pair of electrical terminals at opposite ends of the enclosure for connecting the arrester between a line-potential conductor and electrical ground, and an array of other electrical components that form a series electrical path between the terminals. These components typically include a stack of voltage-dependent, nonlinear resistive elements, referred to as varistors. A varistor is characterized by having a relatively high impedance when exposed to a normal system voltage level, and a much lower resistance when exposed to a larger voltage, such as is associated with over-voltage conditions. In addition to varistors, a surge arrester also may include one or more spark gap assemblies electrically connected in series or parallel with one or more of the varistors. Some arresters also include electrically conductive spacer elements coaxially aligned with the varistors and the spark gap assemblies.

SUMMARY

In one general aspect, an electrical apparatus includes at least one housing segment and at least one MOV disk. The housing segment includes a sheath and defines a bore passing through the housing segment that has a first opening at one end of the housing segment and a second opening at the opposite end of the housing segment. The MOV disk is positioned within the bore. An adhesive is positioned in the bore between the MOV disk and the housing segment and is configured to circumferentially bond the MOV disk to the housing segment.

Embodiments of the electrical apparatus may include one or more of the following features. For example, the MOV disk may extend from the bore beyond the first opening and may further extend from the bore beyond the second opening. The electrical apparatus may further include a second MOV disk positioned within the bore and the adhesive may be positioned in the bore between the second MOV disk and the housing segment to bond the second MOV disk to the housing segment. The first MOV disk may or may not be in contact with the second MOV disk.

The electrical apparatus also may further include a second housing segment that encloses a portion of the first MOV disk. The first housing segment may or may not be in contact with the second housing segment. The electrical apparatus may further include a coating, such as a hydrophobic coating, applied to the housing segments.

The housing segment may further include an annular projection extending from a wall of the housing segment into the bore and the annular projection may include a passage through the annular projection. The MOV disk may be adjacent to a first side of the annular projection. The housing may include a second MOV disk that is positioned adjacent to a second, opposite side of the annular projection and an adhesive may be positioned in the bore between the second MOV disk and the housing segment. The second MOV disk may be arranged to be out of physical contact with the first MOV disk, but in electrical contact with the first MOV disk through an electrically conductive element. The housing may further include a second housing segment enclosing at least a portion of the second MOV disk and an adhesive positioned in the bore between the second MOV disk and the second housing segment. The second housing segment may or may not be in contact with the first housing segment.

In another general aspect, constructing an electrical apparatus includes providing a housing segment, positioning a MOV disk within the housing segment, and using an adhesive to bond the MOV disk to the housing segment. The housing segment includes a sheath and defines a bore passing through the housing segment and having a first opening at one end of the housing segment and a second opening at the opposite end of the housing segment. The MOV disk has a first end and a second end within the bore such that the second end extends from the second opening in the bore. The adhesive is placed in the bore between the MOV disk and the housing segment.

Embodiments may include one or more of the features described above, as well as the following features. For example, constructing the electrical apparatus may further include providing a second housing segment, positioning a second MOV disk, placing an adhesive between the MOV disk and the housing segment; inserting the first MOV disk into the second housing segment, and placing an adhesive between the first MOV disk and the second housing segment. The second housing segment includes a sheath and defines a bore having a first opening at one end of the second housing segment and a second opening at the opposite end of the second housing segment. The second MOV disk has a first end and a second end within the bore of the second housing segment such that the second end extends from the second opening in the bore. Inserting the first MOV disk includes inserting the second end of the first MOV disk into the first end of the second housing segment. The adhesive placed between the first MOV disk and the second housing segment is placed in the bore between the first MOV disk and the second housing segment.

Constructing the electrical apparatus may further include providing additional housing segments and MOV disks, mounting them to one or both of the first MOV disk and the second housing segment, and bonding the MOV disks to the housing segments using an adhesive. A coating, such as a hydrophobic coating, may be applied to the housing.

The first housing segment may be in contact with the second housing segment but may not be in contact with the second housing segment such that an exposed portion of each MOV disk is not enclosed by the housing segments and the coating is applied to the exposed portion of each MOV disk.

Each housing segment may include an annular projection extending from a wall of the bore into the bore and the first end of the first MOV disk may be adjacent to the annular projection and the second end of the second MOV disk may be adjacent to an opposite side of the annular projection. The annular projection may include a passage through the annular projection and an electrically conductive element may be placed in the passage whereby the first MOV disk is in electrical contact with the second MOV disk.

The use of circumferentially bonded housing segments provides considerable advantages. For example, the circumferential bonds between the housing segments and the MOV disks are strong enough to prevent the surge arrester from breaking when subjected to horizontal forces. The methods of circumferentially bonding the housing segments to the MOV disks allows the manufacturer to produce and store subassemblies that can be assembled easily into an electrical apparatus when an order is received. The exposed disk surge arresters provide the advantage of reducing the amount of material used to form the weather shed, which reduces costs.

The details of one or more implementations are set forth in the accompanying drawings and the description below. Other features and advantages will be apparent from the description, the drawings, and the claims.

DESCRIPTION OF DRAWINGS

Like reference symbols in the various drawings indicate like elements.

DETAILED DESCRIPTION

Figure 2:
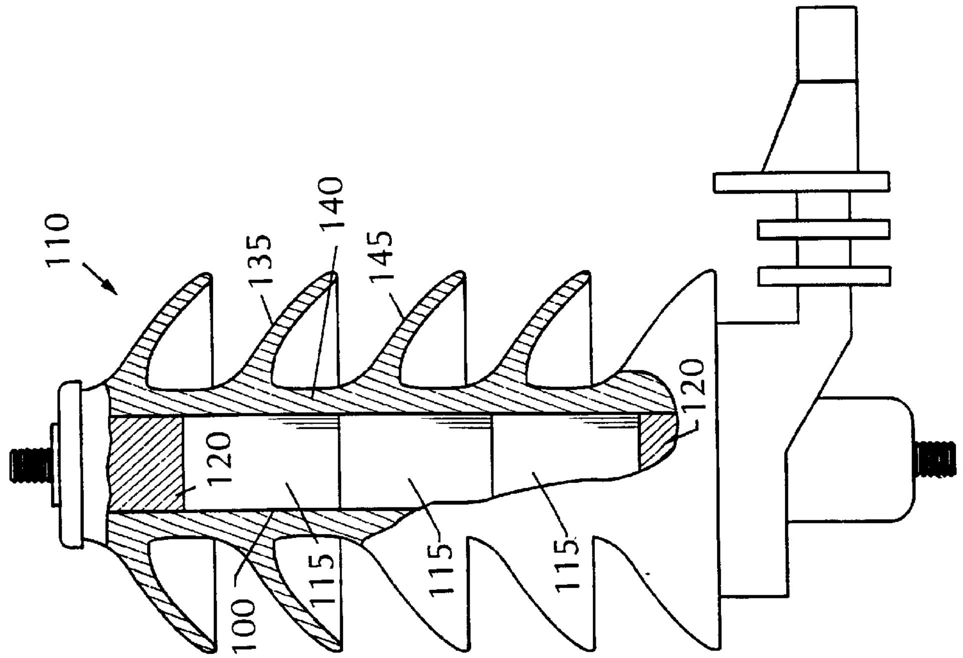
FIG. 2 is a partial cross-sectional side view of a surge arrester employing the module of FIG. 1.
Figure 1:
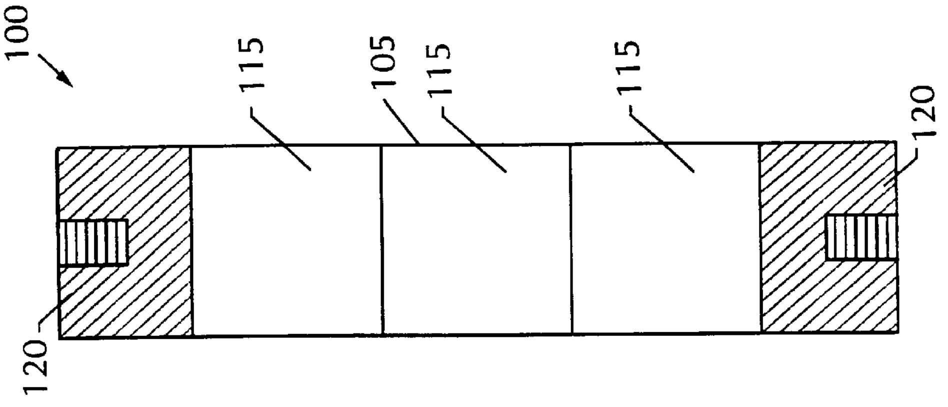
FIG. 1 is a cross-sectional side view of an electrical component module.

Referring to FIGS. 1 and 2, an electrical component module 100 includes a bonded element stack 105 that serves as both the electrically-active component and the mechanical support component of an electrical apparatus, such as a surge arrester 110. The stack 105 also exhibits high surge durability, in that it can withstand high current, short duration conditions, or other required impulse duties.

Elements of the bonded element stack 105 are stacked in an end-to-end relationship and bonded together at their end surfaces. Since the elements of the stack 105 are affirmatively bound together, the arrester 110 does not need to include a mechanism or structure for applying an axial load to the elements. The surge arrester 110 may be implemented as a distribution class surge arrester. It should be understood, however, that the module 100 may be used in other types of surge arresters, and in other electrical protective equipment.

The bonded element stack 105 may include different numbers of elements, and elements of different sizes or types. Examples include varistors, capacitors, thermistors, thermistors, and resistors. For purposes of explanation, the stack is shown as including three metal oxide varistors ("MOVs") 115 and a pair of terminals 120.

The bonded element stack 105 is installed in a housing 135, which includes a sheath 140 and sheds 145. The housing 135 is made of an electrically insulating material, such as porcelain or a polymer, and protects the bonded element stack 105 from environmental conditions. The housing 135 can be coated with a durable coating, such as room temperature vulcanized ("RTV") silicone to provide a hydrophobic surface that causes water to bead on the surface of the housing rather than form a continuous layer of water along the entire surface. By forming beads, i.e., discrete regions of water, leakage currents and dry band arcing from the surge arrester cannot travel the length of the weather shed, as would be the case if there was a continuous layer of water on the surface of the housing. Leakage currents and dry band arcing can cause degradation and eventual failure of the housing.

Figure 3:
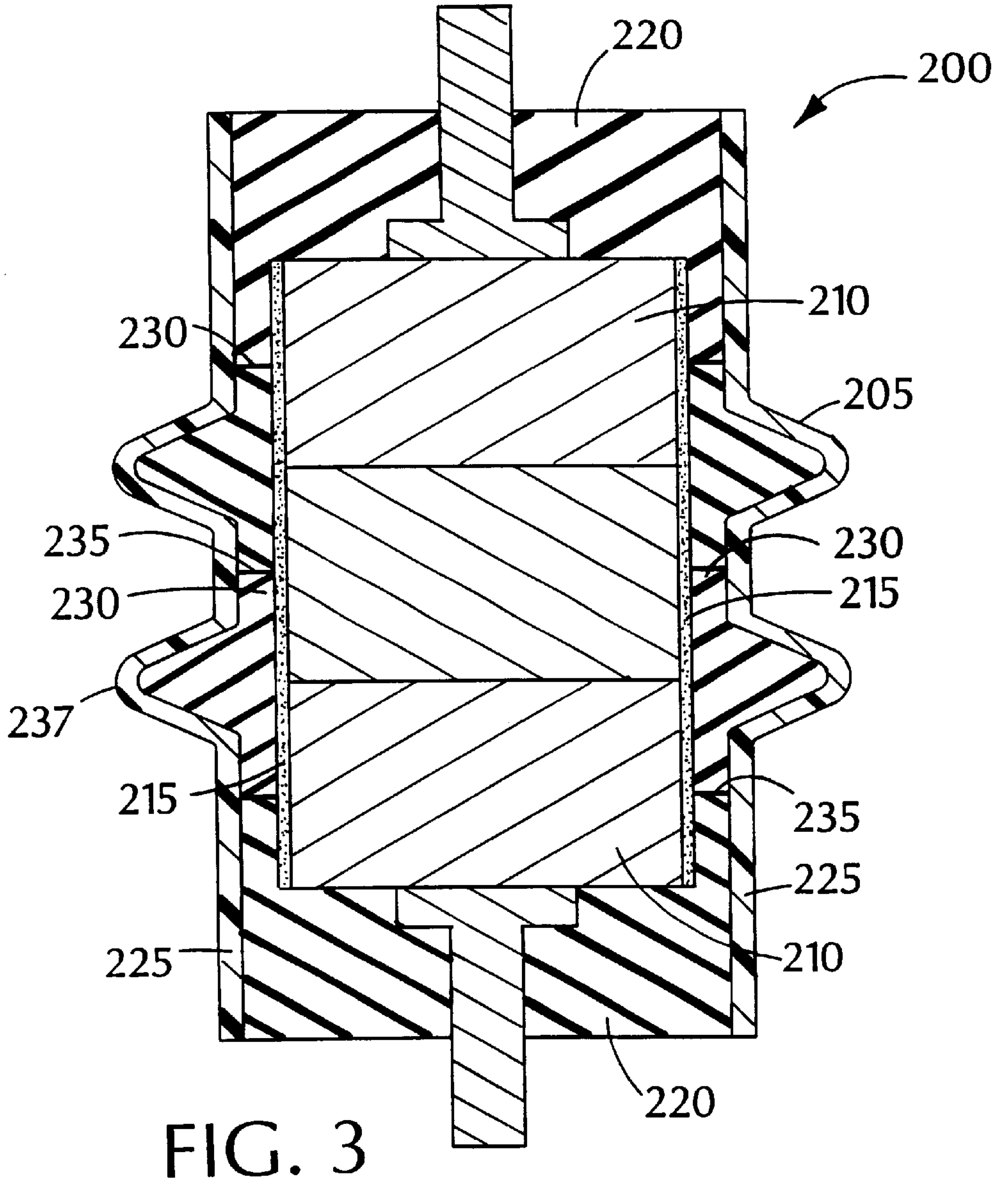
FIG. 3 is a cross-sectional side view of a surge arrester employing housing segments.
Figure 4:
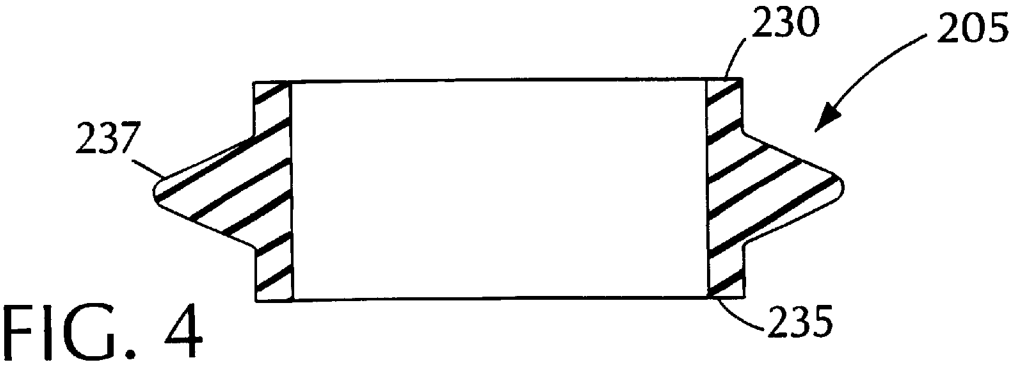
FIG. 4 is a cross-sectional side view of a housing segment of the surge arrester of FIG. 3.

Referring to FIGS. 3 and 4, a surge arrester 200 includes housing segments 205, MOV disks 210, a layer of epoxy adhesive 215, a pair of end electrical terminals 220, and an outer coating 225. The housing segments 205 are made of an insulating material, such as porcelain, or an electrically insulative polymer, such as high temperature vulcanized ("HTV") silicone, an ethylene-propylene-based material, an ethylene vinyl acetate, an elastomeric insulative material, or a cycloaliphatic resin. The outer coating 225 is made of a durable material such as RTV silicone or HTV silicone. The outer coating provides improved durability if it also is a hydrophobic material, such as RTV silicone, HTV silicone, or liquid rubber ("LS") rubber. The housing segments have an upper end 230, a lower end 235, and an outer projection or fin 237. The upper end 230 of one housing segment is flush with the lower end 235 of an adjacent housing segment to form a continuous surface along the length of the arrester 200.

The housing segments 205 differ from the housing 135 in a number of ways. For example, the housing segments typically have fewer projections or fins 237 than does a housing 135. The housing segments 205 typically also are shorter than the housing 135. These and other differences between the housing segments 205 and the housing 135 impact the method of constructing the surge arrester. For example, the relative lengths of the housing segments 205 and the MOV disks 210 permit construction of the surge arrester 200 in pieces by adding MOV disks and housing segments in a repeating sequence until the desired length is attained. The surge arrester 110, to the contrary, cannot be constructed in a piece-wise fashion. Instead, the bonded element stack 105 is inserted as a unit into the housing 135.

Figure 5:
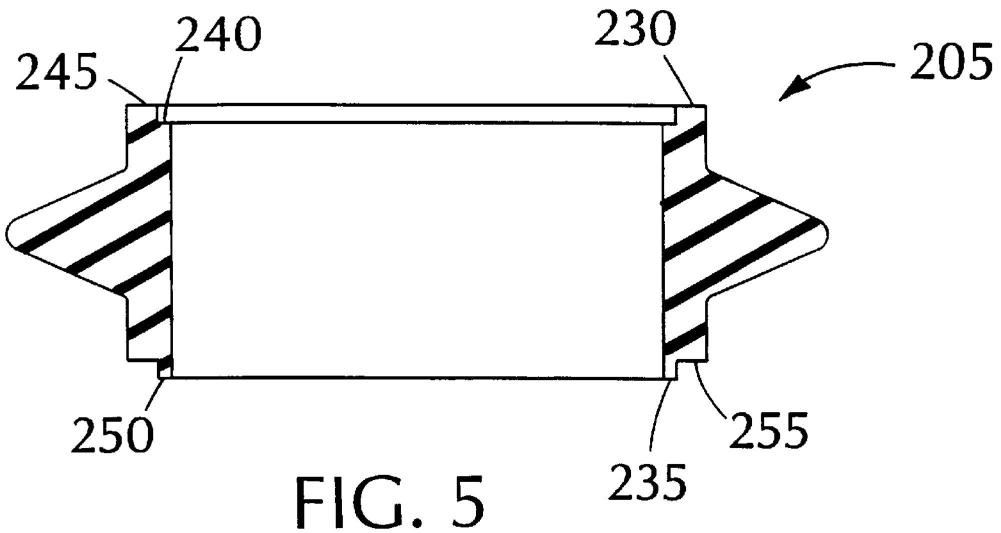
FIGS. 5 and 6 are cross-sectional side and top views, respectively, of a housing segment.
Figure 6:
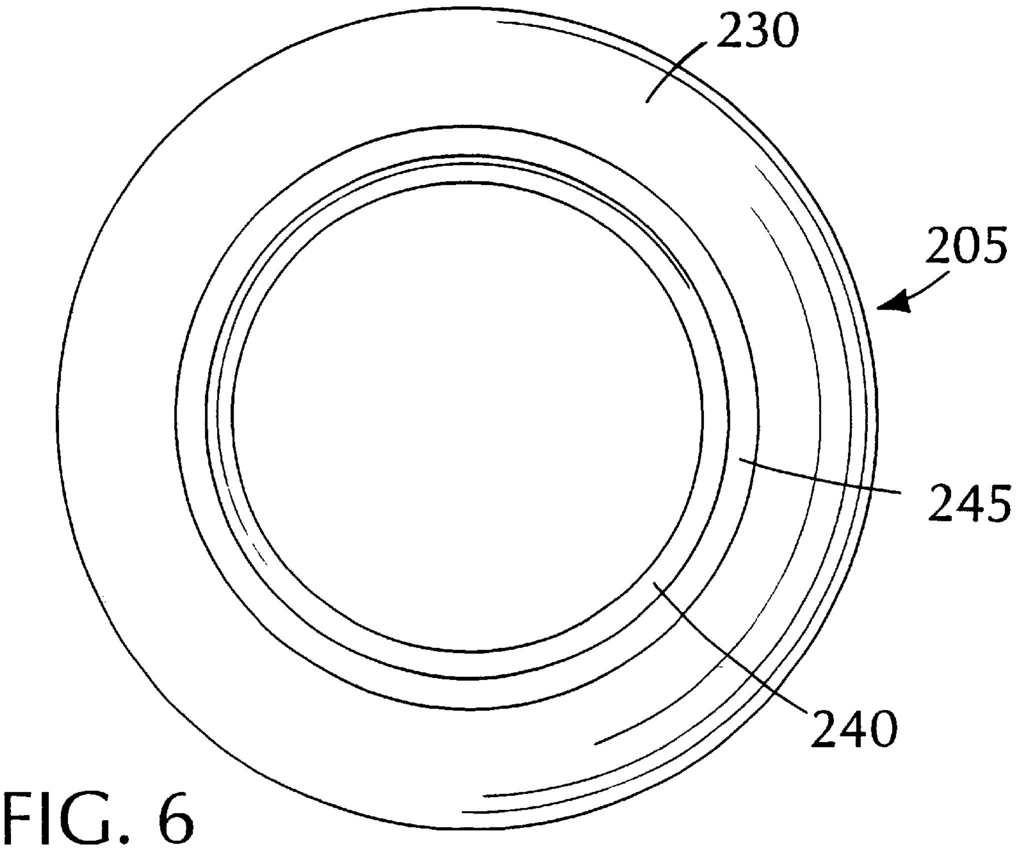

Referring to. FIGS. 5 and 6, the housing segments 205 may be configured so that the upper end 230 and the lower end 235 have mating surfaces that mate with opposite mating surfaces of adjacent housing segments 205. For example, upper end 230 includes a mating surface with a recessed groove 240 that is surrounded by an outer lip 245 and lower end 235 includes a mating surface with a protruding lip 250 that is surrounded by a surface 255. The protruding lip 250 has an outer diameter that is less than the inner diameter of the groove 240 such that a pair of housing segments 205 can be mated with the outer lip 245 flush with the surface 255 and the protruding lip 250 flush with the recessed groove 240 and surrounded by the outer lip 245. With this configuration, it is easy for the manufacturer to align the housing segments during manufacture.

Figure 7:
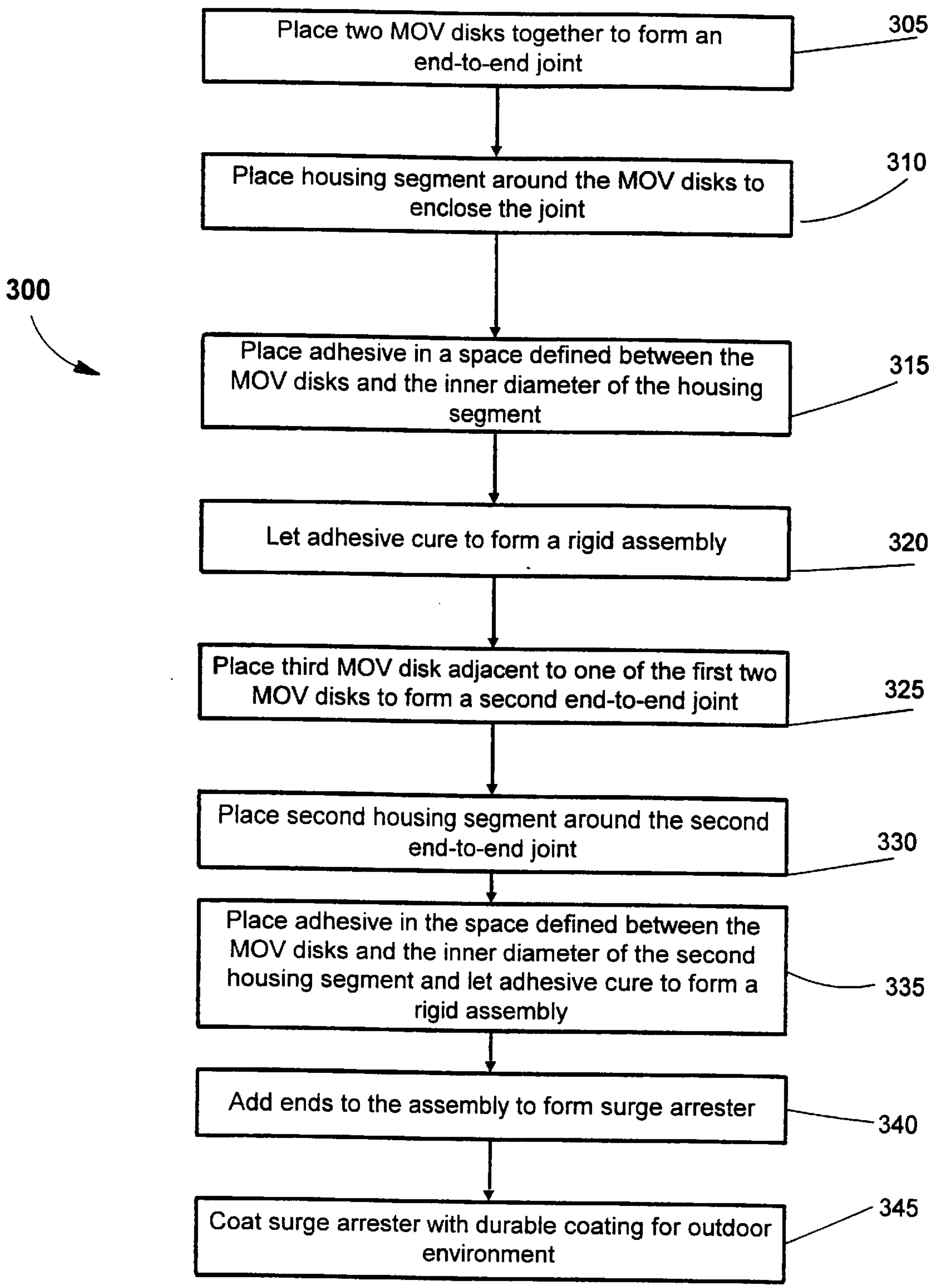
FIG. 7 is a flow chart of the process used to fabricate the surge arrester of FIG. 3.

Referring to FIG. 7, the surge arrester 200 is formed in an improved step-wise assembly process 300 that uses multiple housing segments 205 and multiple MOV disks 210. Two MOV disks 210 are placed together to form a first end-to-end joint (step 305). A conductive epoxy or other conductive adhesive optionally can be placed between the MOV disks 205 to bond them together. The housing segment 205 then is placed around the MOV disks 210 such that the end-to-end joint is enclosed (step 310). An epoxy adhesive then is placed in the space between the inner diameter of the housing segment 205 and the outer diameter of the MOV disks 210 (step 315). The adhesive may be a heat-activated adhesive that is pre-formed on the inner diameter of the housing segment such that heat can be applied after the housing segment is placed around the MOV disks to cause the adhesive to bond to the MOV disks. When the adhesive cures it forms the adhesive layer 215 that retains the MOV disks 210 and the housing segment 205 together as a rigid assembly (step 320). A third MOV disk 210 then is placed against one of the MOV disks to form a second end-to-end joint (step 325), and a second housing segment 205 is placed around the MOV disks to enclose the second end-to-end joint (step 330). For example, the upper end 230 of the second housing segment is placed against the lower end 235 of the first housing segment 205. The adhesive then is placed between the second housing segment and the MOV disks (step 335). Steps 325–335 can be repeated as many times as necessary to form a surge arrester having the properties and length desired. The electrical terminals 220 then are placed on the ends using the adhesive in the manner described above. (step 340). Finally, a durable coating is placed over the entirety of the surge arrester 200 to protect the arrester from the environment (step 345).

The surge arrester can be formed, for example, by fabricating the housing segments from an electrically insulative material, such as porcelain, an ethylene-propylene-based material, an ethylene vinyl acetate, a cycloaliphatic resin, or an elastomeric or polymeric insulative material such as is described in U.S. application Ser. No. 09/771,027, titled "Improved Hydrophobic Properties of Polymer Housings," which was filed on Jan. 29, 2001 and is incorporated by reference. The housing segment can be formed from separate parts, such as a sheath and a fin, with the fin being placed over or around the sheath. In such a configuration, the sheath and the fin can be made of the same or different materials. The coating applied to the housing segment and surge arrester can be, for example, a hydrophobic silicone rubber, such as RTV silicone, HTV silicone, or LS rubber, or a high voltage paint.

Figure 8:
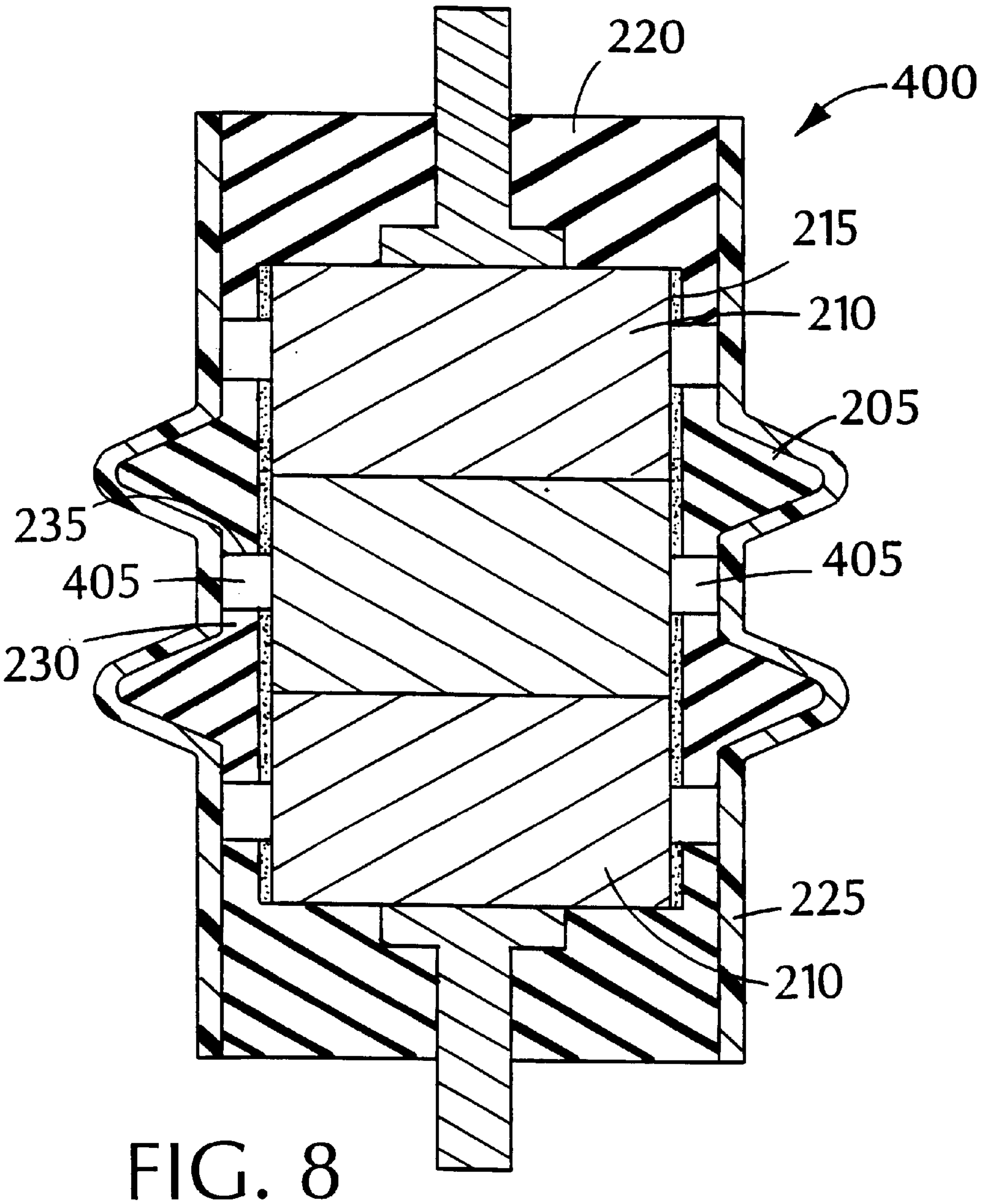
FIG. 8 is a cross-sectional side view of a surge arrester employing housing segments with exposed MOV disks.

Referring to FIG. 8, an exposed-disk surge arrester 400, like the surge arrester 200, includes the housing segments 205, the MOV disks 210, the layer of epoxy adhesive 215, the pair of end electrical terminals 220, and the outer coating 225. The surge arrester 400, however, is not constructed with a flush, end-to-end stacking of the housing segments 205. Instead, the surge arrester 400 is constructed using a process that is similar to the process 300 used to construct the surge arrester 200. The primary difference is that instead of a flush end-to-end stacking of the housing segments 205, there is a space 405 left between the upper end 230 of the housing segment 205 and the lower end 235 of the adjacent housing segment. Unlike the construction of the surge arrester 200, when a second and subsequent housing segment 205 is placed around the MOV disks 210, the housing segment 205 is centered around the joint instead of being positioned flush against the adjacent housing segment 205. The housing segment 205 may be centered around the joint manually or automatically, if the process is automated. The space 405 left between the housing segments optionally is filled with the outer coating 225 when the coating is applied to the surge arrester 400.

Figure 9:
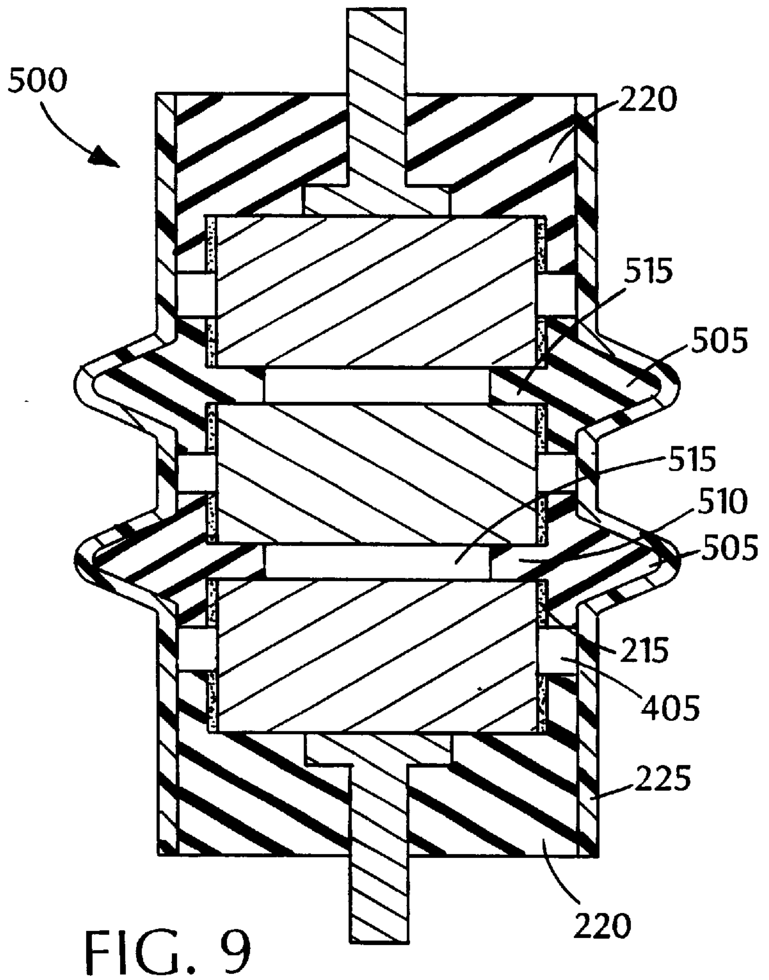
FIG. 9 is a cross-sectional side view of a surge arrester employing housing segments with exposed, separated MOV disks.
Figure 10:
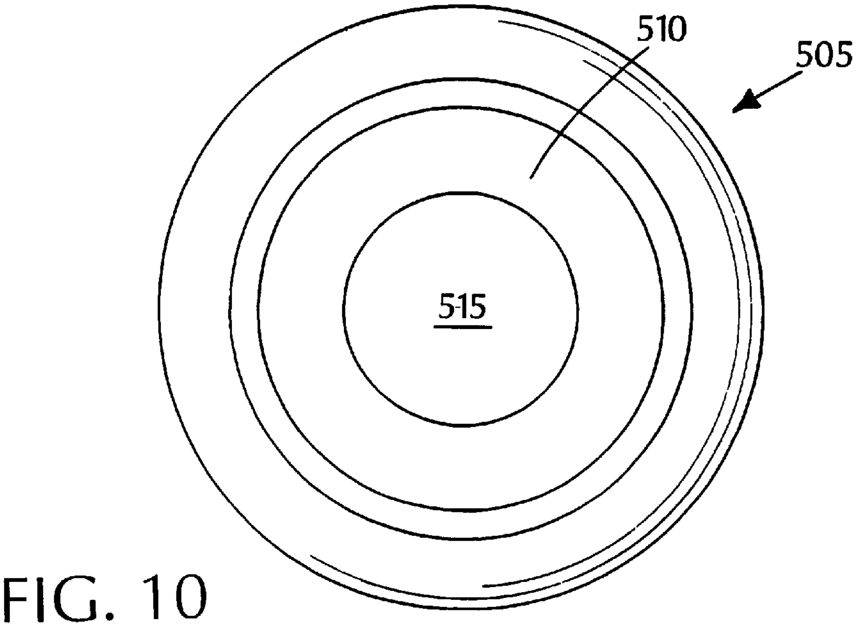
FIG. 10 is a top view of a housing segment of the surge arrester of FIG. 9.

Referring to FIGS. 9 and 10, an exposed-disk, spaced-shed surge arrester 500, which is similar to the surge arrester 400, also includes the MOV disks 210, the layer of epoxy adhesive 215, the pair of end electrical terminals 220, and the outer coating 225. The surge arrester 500, however, is constructed using a spaced housing segment 505, which includes an annular projection 510 that protrudes into the inner diameter of the shed, defines a space 515 between the inner diameter of the annular projection, and separates the MOV disks 205. The space 515 is completely or partially filled with an electrically conductive element, such as a spacer spring, a conductive epoxy or adhesive, a metal plate or washer, or another device or system, to form an electrical connection between the adjacent MOV disks 205. Examples of electrically conductive elements that can be placed within the space 515 and used to electrically connect the adjacent MOV disks 205 are described in U.S. patent application Ser. No. 09/577,837, titled "Compliant Joint Between Electrical Components," and filed on May 25, 2000, which is incorporated by reference. The element may be bonded to the adjacent MOV disks 205 if necessary to form an electrical connection. If an electrical connection can be formed without bonding, the element may be positioned between the adjacent MOV disks without bonding.

Figure 11:
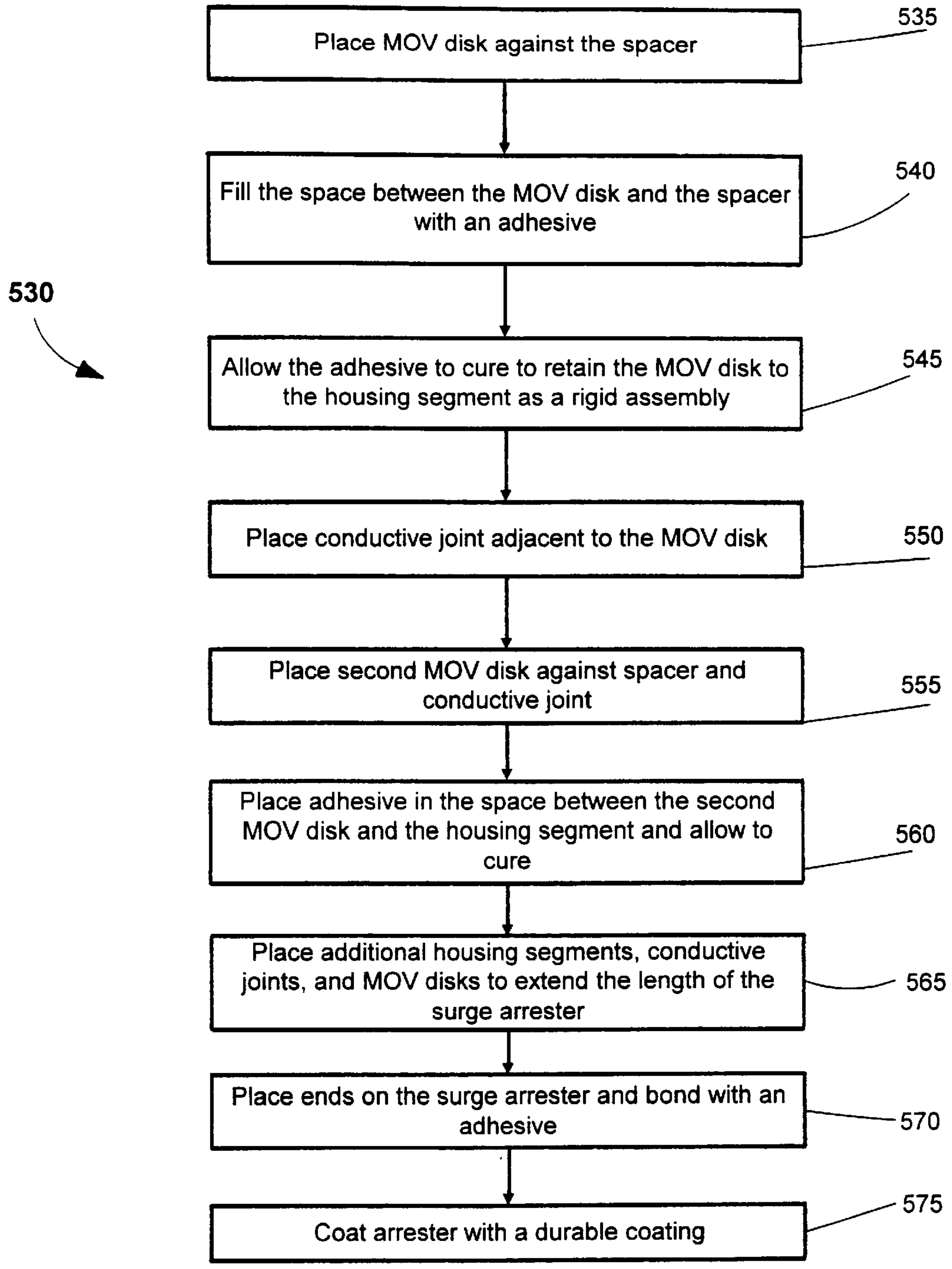
FIG. 11 is a flow chart of the process used to fabricate the surge arrester of FIG. 9

Referring also to FIG. 11, the surge arrester 500 is constructed in an improved stepwise assembly process 530 using multiple housing segments 505 and multiple MOV disks 210. A MOV disk 210 is placed against the annular projection 510 and centered within the housing segment 505 such that the space between the outer diameter of the MOV disk 210 and the inner diameter of the housing segment 505 is approximately the same around the circumference of the MOV disk 210 (step 535). An epoxy or another adhesive then is placed in the space between the inner diameter of the housing segment 505 and the outer diameter of the MOV disk 210 (step 540). The adhesive may be a heat activated adhesive that is pre-formed on the inner diameter of the housing segment 505 such that heat can be applied after the housing segment is placed around the MOV disk to cause the adhesive to bond to the MOV disk. The cured adhesive forms the layer of adhesive 215 that retains the MOV disk 210 and the housing segment 505 together as a rigid assembly (step 545). Before a second MOV disk 210 is placed against the other side of the annular projection, a spacer spring, a conductive epoxy or adhesive, a metal plate or washer, or another device or system for forming an electrical connection between the adjacent MOV disks 205 is placed against the MOV disk. A second MOV disk 210 then is placed against the other side of the annular projection 510 and centered within the housing segment 505 (step 550). An epoxy or an adhesive then is placed in the space between the inner diameter of the housing segment 505 and the outer diameter of the second MOV disk 210 and allowed to cure (step 555). Subsequent housing segments 505 and MOV disks 210 can be added to extend the length of the arrester 500 (step 560). When the desired length of the arrester 500 is attained, ends 220 are added to the arrester 500 and bonded using an epoxy or other adhesive (step 565). The completed arrester 500 then is coated with a durable coating 225 that protects the arrester from an outdoor environment (step 570). The coating may be, for example, a hydrophobic coating.

Figure 12:
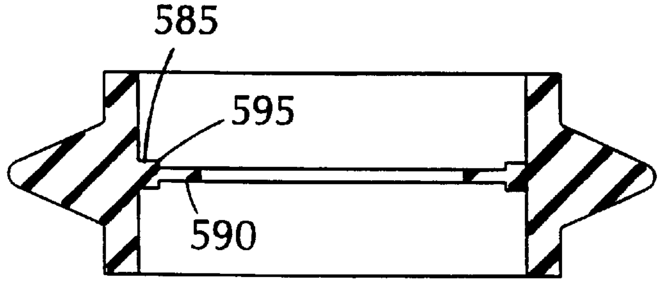
FIG. 12 is a cross-sectional side view of a housing segment having a multi-thickness annular projection.

Referring to FIG. 12, the housing segment 505 can be fabricated to ensure that the MOV disks 115 are centered within the housing segments. For example, the housing segment 505 may include the annular projection 515 being formed with multiple thicknesses. As illustrated in FIG. 12, the housing segment 505 includes a first, thicker section 585 and a second, thinner section 590. A ledge or shoulder 595 delineates the transition between the first section and the second section. The ledge 595 forms a ring that has an inner diameter that mates with the outer diameter of the MOV disks 115. Thus, when the MOV disks 115 and the housing segments 505 are assembled, the manufacturer can center the MOV disks 115 within the housing segments without the used of tools to center the disk.

Figure 13:
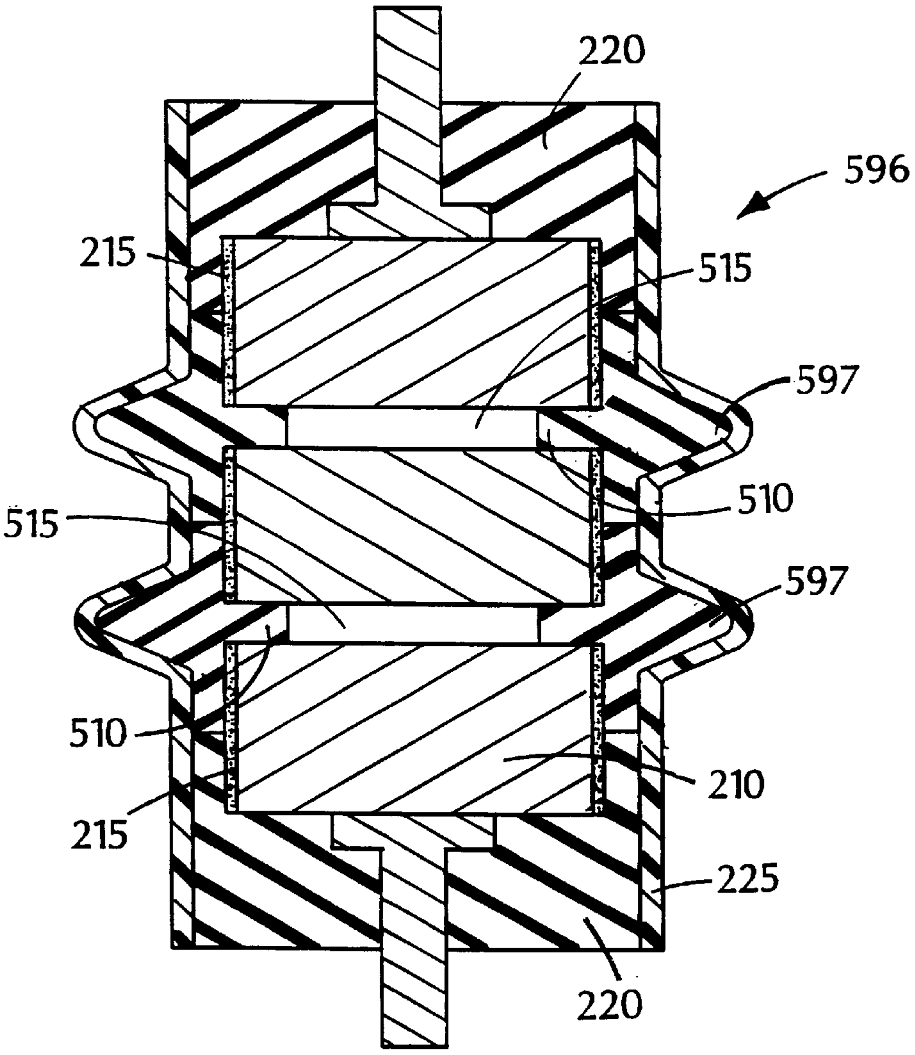
FIG. 13 is a cross-sectional side view of a surge arrester employing housing segments with annular projections and assembled in end-to-end contact.

Referring to FIG. 13, a spaced-shed surge arrester 596, which is similar to the surge arresters 400 and 500, also includes the MOV disks 210, the layer of epoxy adhesive 215, the pair of end electrical terminals 220, the outer coating 225, and the annular projection 510. The surge arrester 596, however, is constructed using housing segments 597 that are assembled in end-to-end contact with adjacent housing segments 597 such that the MOV disks 210 are not exposed. The space 515 between the MOV disks 210 is completely or partially filled with a spacer spring, a conductive epoxy or adhesive, a metal plate or washer, or another element or system to form an electrical connection between the adjacent MOV disks 210. Examples of elements that can be placed within the space 515 and used to electrically connect the adjacent MOV disks 205 are described in U.S. patent application Ser. No. 09/577,837, titled "Compliant Joint Between Electrical Components," and filed on May 25, 2000, which is incorporated by reference. The element may be bonded to the adjacent MOV disks 205 if necessary to form an electrical connection. If an electrical connection can be formed without bonding, the element or system may be positioned between the adjacent MOV disks without bonding.

Figure 14:
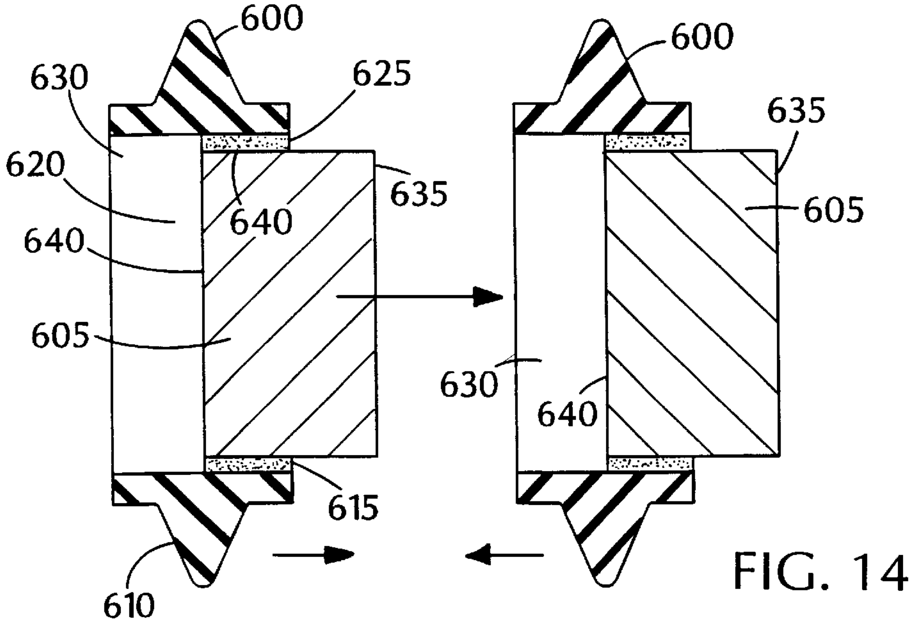
FIGS. 14–16 are cross-sectional side views showing the assembly of a pair of housing segments and MOV disk assemblies.

A manufacturer of an electrical apparatus can manufacture the housing segments and MOV disks as an assembly and then assemble them into a completed electrical apparatus as orders are received. For example, referring to FIG. 14, a manufacturer can fabricate an assembly 600 that includes a MOV disk 605 mounted and retained within a housing segment 610 using an adhesive 615. The housing segment 610 has a bore 620 passing between a first opening 625 and a second opening 630. The MOV disk 605 has a first end 635 and a second end 640 and is positioned within the bore 610 such that the first end 635 extends beyond the first opening 625. The adhesive 615 is positioned around a portion 645 of the MOV disk 605 that is within the housing segment 610. To form a housing for an electrical apparatus, the adhesive is placed around the first end 635 of one assembly 600 and then the first end 635 of the MOV disk 605 is inserted into the second opening of a second assembly 600. The adhesive then is allowed to cure to form a rigid bond between the housing segment and the MOV disk. This bond prevents the surge arrester from breaking when subjected to horizontal forces. The method of FIG. 14 can be applied to any of the implementations described above. Thus, the housing segments 610 can be in end-to-end contact or can have a space between adjacent ends. Similarly, the housing segments can include a annular projection to separate the MOV disks.

Figure 15:
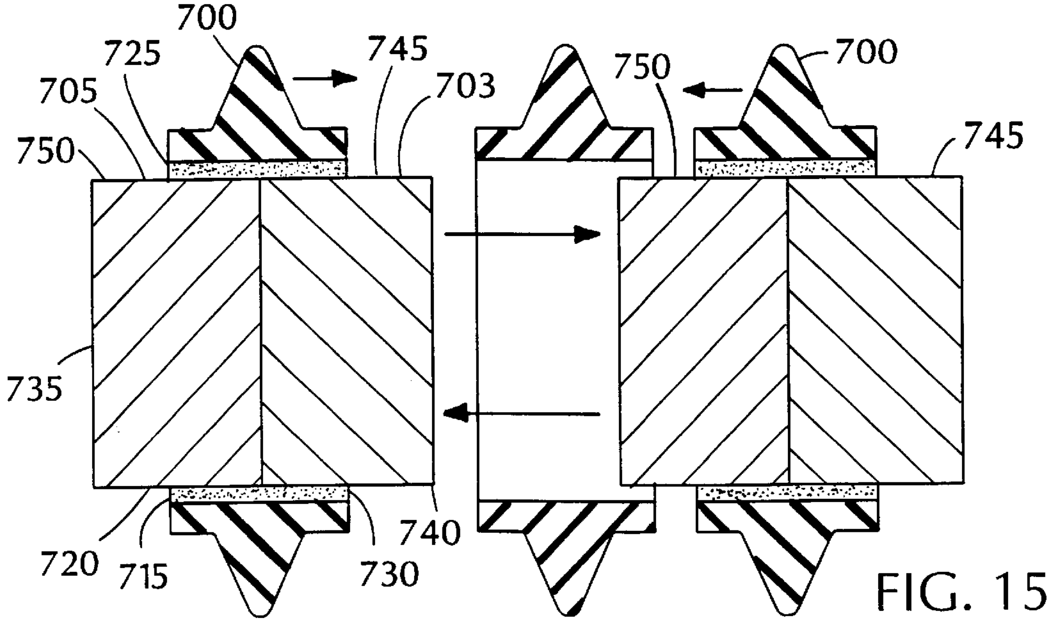

Referring to FIG. 15, in using another method to fabricate an electrical apparatus, a manufacturer fabricates an assembly 700 that includes a first MOV disk 703 and a second MOV disk 705 mounted within a housing segment 710 using an adhesive 715. The housing segment 710 has a bore 720 passing between a first opening 725 and a second opening 730. The MOV disks 703 and 705 have first ends 735 and second ends 740 and are positioned within the bore 720 such that the first end 735 of the second MOV disk 705 extends beyond the first opening 725 and the second end 740 of the first MOV disk 703 extends beyond the second opening 730. The manufacturer then can store multiple assemblies 700 until an order is place for an electrical apparatus that includes the assemblies 700.

To assemble a pair of assemblies 700 to each other to form an electrical apparatus, adhesive 715 is placed around a portion 745 of the MOV disk 703 that extends beyond the housing segment 710 and adhesive 715 is placed around a portion 750 of the MOV disk 705 that extends beyond another housing segment 710. The portions 745 and 750 are inserted into a third housing segment 710 such that the adhesive bonds the MOV disks 703 and 705 to the housing segments 710 to form a rigid bond. To vary the length and characteristics of the electrical apparatus, the manufacturer adds additional assemblies 700 and housing segments 710 as described above. When the desired length or electrical characteristics of the electrical apparatus are attained, end caps may be placed around the ends and a coating applied to the electrical apparatus. The coating may be, for example, any of the hydrophobic coatings described above.

The housing segment 710 that is used to assemble a pair of assemblies 700 may have a length such that the MOV disks 703 and 705 are completely enclosed and each housing segment 710 is in end-to-end contact with the adjacent housing segment 710. The length also may be such that the MOV disks 703 and 705 are not completely enclosed and the housing segments 710 are not in end-to-end contact with the adjacent housing segment 710. In this configuration, the coating is applied to the exposed portions of the MOV disks as well as to the housing segments.

Figure 16:
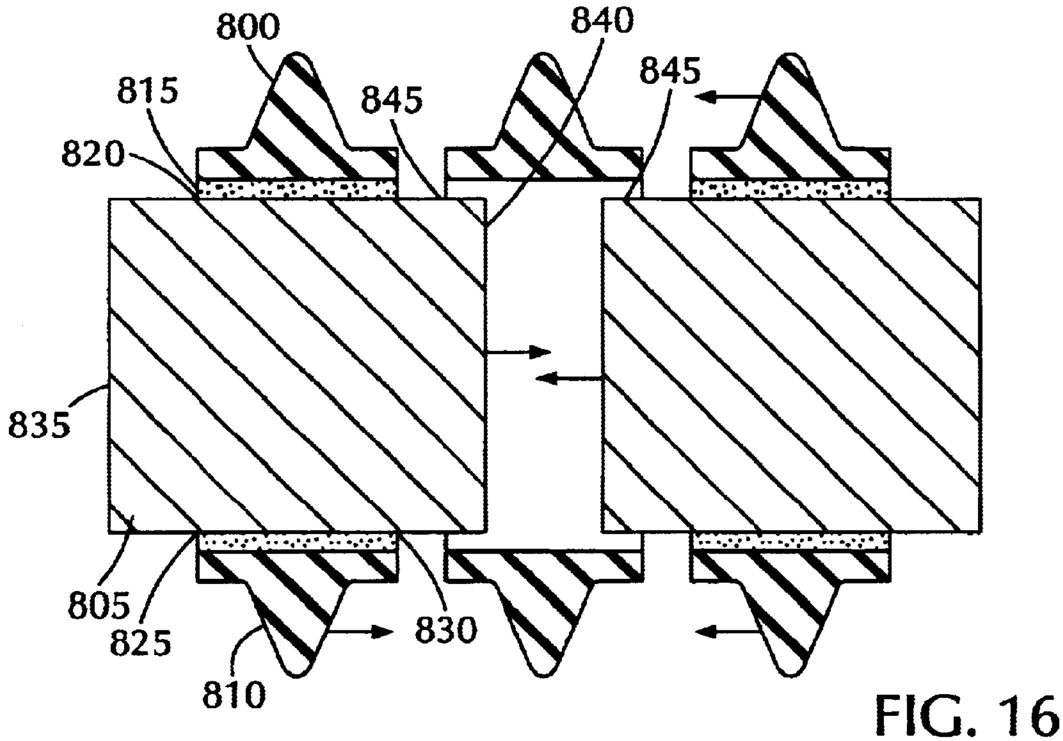

Referring to FIG. 16, to fabricate an electrical apparatus, a manufacturer can fabricate an assembly 800 that includes a MOV disk 805 that is mounted within a housing segment 810 using an adhesive 815. The housing segment 810 has a bore 820 that passes between a first opening 825 and a second opening 830. The MOV disk 805 has a first end 835 and a second end 840 and is positioned within the bore 820 such that the first end 835 extends beyond the first opening 825 and the second end 840 extends beyond the second opening 830. The manufacturer then can store multiple assemblies 800 until an order is place for an electrical apparatus that includes the assemblies 800.

To assemble a pair of assemblies 800 to each other to form an electrical apparatus, adhesive 815 is placed around a portion 845 of each MOV disk 805 that extends beyond the housing segment 810. The portions 845 then are inserted into opposite ends of a third housing segment 810 such that the adhesive bonds the MOV disks 805 to the third housing segment 810. To vary thelength and characteristics of the electrical apparatus, the manufacturer adds additional assemblies 800 and housing segments 810 as described above. When the desired length and electrical characteristics of the electrical apparatus are attained, end caps maybe placed around the ends and a coating applied to the electrical apparatus. The coating may be, for example, any of the hydrophobic coatings described above.

The third housing segment 810 used to assemble a pair of assemblies 800 may have a length such that the MOV disks 805 are completely enclosed and each housing segment 810 is in an end-to-end contact with the adjacent housing segment 810. The length also may be such that the MOV disks 805 are not completely enclosed and the housing segments 810 are not in an end-to-end contact with the third housing segment 810. For example, the third housing segment may be short or it may have a annular projection that extends into the opening of the bore 820. In the configuration without the end-to-end contact, the coating is applied to the exposed portions of the MOV disks as well as to the housing segments.

A number of implementations have been described. Nevertheless, it will be understood that various modifications may be made. For example, the methods and devices described above can be used in any electrical apparatus that uses an insulator and an element stack, such as a transformer, a capacitor, a switch, a recloser, a circuit breaker, a feed through bushing, a suspension insulator, a dead ends insulator, a post insulator, a pin insulator, and a buss support. Accordingly, other implementations are within the scope of the following claims.

What is claimed is:

1. An electrical apparatus, comprising:

a first discrete housing segment including a sheath and defining a bore having a first opening at one end of the housing segment and a second opening at the opposite end of the housing segment;

a second discrete housing segment including a sheath and defining a bore having a first opening at one end of the housing segment and a second opening at the opposite end of the housing segment, wherein the first opening of the first housing segment is coupled to the second opening of the second housing segment;

at least one MOV disk positioned within the bore of the first housing segment; and an adhesive positioned in the bore of the first housing segment between the MOV disk and the first housing segment and being configured to bond the MOV disk to the first housing segment.

2. The electrical apparatus of claim 1 wherein the MOV disk extends from the bore beyond the first opening.

3. The electrical apparatus of claim 2 wherein the MOV disk extends from the bore beyond the second opening.

4. The electrical apparatus of claim 1 further comprising a second MOV disk positioned within the bore of the first housing segment, wherein the adhesive is positioned in the bore of the first housing segment between the second MOV disk and the first housing segment and is configured to bond the second MOV disk to the first housing segment.

5. The electrical apparatus of claim 4 wherein the first MOV disk is in contact with the second MOV disk.

6. The electrical apparatus of claim 4 wherein the first MOV disk is not in contact with the second MOV disk.

7. The electrical apparatus of claim 4 wherein the second housing segment encloses a portion of the first MOV disk.

8. The electrical apparatus of claim 7 wherein the first housing segment is directly coupled to the second housing segment.

9. The electrical apparatus of claim 7 wherein the first housing segment is indirectly coupled to the second housing segment.

10. The electrical apparatus of claim 1 wherein the first housing segment further comprises a annular projection extending from a wall of the housing segment into the bore.

11. The electrical apparatus of claim 10 wherein the annular projection includes a passage through the annular projection.

12. The electrical apparatus of claim 11 wherein the MOV disk is adjacent to a first side of the annular projection.

13. The electrical apparatus of claim 12 further comprising a second MOV disk being positioned adjacent to a second, opposite side of the annular projection and an adhesive positioned in the bore of the first housing segment between the second MOV disk and the first housing segment.

14. The electrical apparatus of claim 13 wherein the second MOV disk is not in physical contact with the first MOV disk.

15. The electrical apparatus of claim 13 wherein the second MOV disk is in electrical contact with the first MOV disk through an electrically conductive element.

16. The electrical apparatus of claim 13 wherein the second housing segment encloses at least a portion of the second MOV disk, the apparatus further comprising an adhesive positioned in the bore of the second housing segment between the second MOV disk and the second housing segment.

17. The electrical apparatus of claim 16 wherein the second housing segment is indirectly coupled to the first housing segment.

18. The electrical apparatus of claim 16 wherein the second housing segment is directly coupled to the first housing segment.

19. The electrical apparatus of claim 1 further comprising a coating applied to the first housing segment.

20. The electrical apparatus of claim 1 wherein the coating comprises a hydrophobic coating.

21. A method of constructing an electrical apparatus, comprising:

providing a first discrete housing segment including a sheath and defining a bore having a first opening at one end of the first housing segment and a second opening at the opposite end of the first housing segment;

positioning a MOV disk having a first end and a second end within the bore of the first housing segment such that the second end of the MOV extends from the second opening of the bore;

placing an adhesive in the bore between the MOV disk and the first housing segment to bond the MOV disk to the first housing segment;

providing a second discrete housing segment including a sheath and defining a bore having a first opening at one end of the second housing segment and a second opening at the opposite end of the second housing segment;

inserting the second end of the first MOV disk into the first opening of the second housing segment; and placing an adhesive in the bore of the second housing segment between the first MOV disk and the second housing segment.

22. The method of claim 21 further comprising:

positioning a second MOV disk having a first end and a second end within the bore of the second housing segment such that the second end extends from the second opening in the bore of the second housing segment; and placing an adhesive in the bore between the second MOV disk and the second housing segment.

23. The method of claim 22 further comprising:

providing additional housing segments and MOV disks, mounting them to one or both of the first MOV disk and the second housing segment, and bonding the MOV disks to the housing segments using an adhesive.

24. The method of claim 23 further comprising applying a coating to the electrical apparatus.

25. The method of claim 24 wherein the first housing segment is in contact with the second housing segment.

26. The method of claim 25 wherein the first housing segment is not in contact with the second housing segment such that an exposed portion of each MOV disk is not enclosed by the housing segments and the coating is applied to the exposed portion of each MOV disk.

27. The method of claim 22 wherein each housing segment includes a annular projection extending from a wall of the bore into the bore and the first end of the first MOV disk is adjacent to the annular projection and the second end of the second MOV disk is adjacent to an opposite side of the annular projection.

28. The method of claim 27 wherein the annular projection includes a passage through the annular projection and an electrically conductive element is placed in the passage whereby the first MOV disk is in electrical contact with the second MOV disk.

* * * * *